United States Patent [19]

Baxmann et al.

[11] 3,920,621
[45] Nov. 18, 1975

[54] PROCESS FOR THE PRODUCTION OF HIGH-MOLECULAR LOW-PRESSURE CO- AND TERPOLYMERS OF ETHYLENE OF LOW DENSITY

[75] Inventors: Fritz Baxmann; Albert Frese; Johann Dietrich; Otto Hahmann, all of Marl, Germany

[73] Assignee: Chemische Werke Huels, Aktiengesellschaft, Marl, Germany

[22] Filed: Feb. 12, 1973

[21] Appl. No.: 332,035

[30] Foreign Application Priority Data

Feb. 11, 1972 Germany............................ 2206429
Mar. 24, 1972 Germany............................ 2214271

[52] U.S. Cl......... 260/80.78; 260/88.2 R; 260/93.7; 260/94.9 R
[51] Int. Cl.²................ C08F 210/08; C08F 210/16
[58] Field of Search......................... 260/80.78, 88.2

[56] References Cited
UNITED STATES PATENTS

| | | | |
|---|---|---|---|
| 2,918,457 | 12/1958 | Jezl.................. | 260/88.2 |
| 2,956,989 | 10/1960 | Jezl.................. | 260/88.2 |
| 3,250,755 | 5/1966 | Natta et al......... | 260/88.2 |
| 3,658,777 | 4/1972 | Green................ | 260/88.2 R |
| 3,666,736 | 5/1972 | Hogan............... | 260/88.2 R |
| 3,794,627 | 2/1974 | Giachetto........... | 260/88.2 R |

FOREIGN PATENTS OR APPLICATIONS

| | | |
|---|---|---|
| 944,371 | 12/1963 | United Kingdom |
| 932,658 | 7/1963 | United Kingdom |
| 967,788 | 8/1964 | United Kingdom |
| 682,659 | 9/1968 | South Africa |
| 7,058 | 4/1965 | Japan |

OTHER PUBLICATIONS

Natta et al., J. Amer. Chem. Soc., 1961, 83, 3343–3344.

Kennedy and Otsu, Advances in Polymer Science, 1970 7, 369–385.

Nakajima, in "Polymer Molecular Weight Methods" Advances in Chemistry Series 125 (American Chemical Society, Washington D.C., 1973), pp. 98–107.

Shimizu et al., J. Polymer Science (Polymer Letters), 1965, 3B, pp. 449–453.

*Primary Examiner*—Joseph L. Schofer
*Assistant Examiner*—A. L. Clingman
*Attorney, Agent, or Firm*—Millen, Raptes & White

[57] ABSTRACT

High molecular weight, low density copolymers of ethylene and propylene and/or butene-1 are prepared by a low pressure liquid phase polymerization process using a titanium halide - organoaluminum catalyst in a polymerization solvent containing butene-2. Consistently comparable ethylene copolymers can be obtained from monomer mixtures of varying composition.

16 Claims, No Drawings

PROCESS FOR THE PRODUCTION OF HIGH-MOLECULAR LOW-PRESSURE CO- AND TERPOLYMERS OF ETHYLENE OF LOW DENSITY

BACKGROUND OF THE INVENTION

This invention relates to a process for the preparation of ethylene copolymers. More particularly, this invention relates to a process for the low-pressure production of high-molecular weight, low density copolymers of ethylene by the copolymerization of ethylene with propylene and/or butene-1 using mixed catalysts of titanium trichloride or an ester of halogenated orthotitanic acid, and an organoaluminum chloride in the liquid phase.

Polyethylenes having high molecular weights are required for various applications, e.g., in the manufacture of loom pickers and other highly stressed parts in the textile industry, in machinery construction, and in the chemical industry, e.g., for feeding screws, gear wheels, runners, valves and slides. Using the Ziegler polymerization process, it is possible to manufacture high-molecular types of polyethylene with RSV values of about 17 (measured in a 0.03% solution in decahydronaphthalene at 135° C., Ostwald-type viscosimeter), which corresponds to a molecular weight of about 1 million, calculated in accordance with the solution viscosity $$lg\ \overline{M} = \frac{lg\ [RSV] - lg\ 3.26 \cdot 10^4}{0.77}$$

(Wesslau, Kunststoffe 49, page 320 (1959)). These products exhibit a density of 0.94.

High-molecular weight types of polyethylene, i.e., having RSV values as defined above of 1.5 or higher, with a lower density, i.e., of 0.930 or lower, have not been known heretofore. Although it is possible using the high-pressure method to produce low density polyethylene having densities of 0.915–0.935, these polymers have molecular weights of only up to about 50,000, calculated according to the solution viscosity.

Polyethylene types of low density are required for various fields of application, e.g., extrusion blow molding to obtain hollow articles and films, for coatings, for flame spraying, and for rotational sintering. Additionally, a narrow molecular weight distribution is necessary for certain purposes, such as e.g, the extrusion blow molding process. The types of polyethylene produced in this density range according to the high-pressure method, with a density range of 0.915–0.935, have the disadvantage that their molecular weights are too low for many applications. In accordance with the low-pressure method, it is difficult or even impossible to set low densities. Thus, according to the low-pressure polymerization processes of Ziegler and Phillips, polyethylenes are obtained having a density of 0.94–0.965 g./cm³.

By copolymerization with other olefins, such as propene and butene-1, it is also possible to produce copolymers having a density of 0.930–0.950 according to the low-pressure method. This is accomplished, pursuant to the teaching of German Pat. No. 1,445,303, by polymerization in inert diluents, such as butane, pentane, hexane, cyclohexane, isopropylcyclohexane, benzene or mixtures of hydrocarbons with the aid of mixed catalysts of halogen-orthotitanic acid esters and organo-metallic compounds of aluminum, in the presence of 0.05–20% by volume of propylene and/or butene-1, based on the ethylene. However, in this process, a considerable excess of propene or butene-1 is required in order to obtain copolymers having a larger proportion of butene-1. For example, at a polymerization pressure of 3 atmospheres gauge, using hexane as the diluent, 8% of butene-1 is required in the mixture of monomers in order to obtain a copolymer with 2% of butene-1. When polymerizing at 12 atmospheres gauge in order to obtain a higher polymerization velocity, the addition of 35% of butene-1 is required to produce a copolymer having 2–3% of butene-1. This copolymerization, furthermore, is successful only with the use of high-percentage 95–99% purity butene-1. With the utilization of 50% strength butene-1 at 12 atomspheres gauge in hexane as the diluent, it is impossible to manufacture a copolymer with 2–3% of butene-1. Besides, this polyethylene obtained with 50% strength-butene-1 is, with 1.0–1.5% butene-1, so fine-grained that it cannot be separated by means of decantation. With the polymerization pressures of 20 atmospheres gauge and thereabove, nowadays customary, it is impossible even when using 95–99% strength butene-1 to obtain a copolymer with 2% of butene-1. Similar difficulties are also encountered in the production of ethene-butene-propene terpolymers and ethene-propene copolymers.

In an attempt to prepare low density ethylene-butene copolymers, Hogan U.S. Pat. No. 3,666,736 describes low density ethylene-butene-1 copolymers which are highly resistant to environmental stress cracking, characterized by freedom from surface stickiness, and have a ratio of weight average to number average molecular weight within the range of 6 to 20. These copolymers are prepared with a chromium oxide polymerization catalyst system.

Since Hogan uses different catalyst systems, the products he obtains are also different. They have a different structure and consequently exhibit different properties, the density ranging from 0.920–0.930 g./cm³ and the portion of vinyl groups contained in the ethylene-butene-1 copolymers amounting to 0.05–0.7/1000 carbon atoms. The ethylene-butene 1 copolymers obtained by our process in this density range contain a considerably lower portion of vinyl groups ranging from 0.05–0.37 vinyl groups/1000 carbon atoms. The ethylene-butene-1 copolymer obtained by our process and shown under Example No. 14 does contain a vinyl group portion of 0.69/1000 carbon atoms which lies within the range of the results obtained by Hogan. The density of this copolymer of 0.9180 g./cm³, however, lies outside this range. The portion of the ethylene side chains (= determined on the basis of the CH₃ groups) with approx. 55/1000 carbon atoms greatly deviates from the values obtained by Hogan. The Hogan copolymer has a molecular weight distribution of 6–20. By our process, copolymers with a smaller-range molecular weight distribution up to a molecular nonuniformity of 2.5 can be obtained.

Green in U.S. Pat. No. 3,658,777, describes a method for controlling the amount of C3-8 olefin comonomer being polymerized with ethylene using a chromium oxide catalyst system wherein a metal alkyl such as diethyl zinc or triethyl borane is added as a catalyst modifier.

The technique used by Green is not employed in our process. Our process is based on special Ziegler catalysts, Green using Phillips catalysts. We are using liquified gas in our process, Green uses hydrocarbons that are liquid under normal conditions, such as cyclohexane. However, with liquid hydrocarbons low-density copolymers of such low values as 0.900 g./cm$^3$ obtainable by our process can be obtained neither by the use of Ziegler nor Phillips catalysts. The copolymers obtained by Green have high densities ranging from 0.944 to 0.952 g./cm$^3$, usually 0.9495 g./cm$^3$.

Consequently, there is the need to provide a more advantageous process making it possible to obtain ethylene co- or terpolymers with a low density, particularly when combined with a narrow molecular weight distribution.

OBJECTS OF THE INVENTION

Accordingly, it is an object of this invention to provide a process for preparing low density copolymers of ethylene and one or more α-olefins.

Another object of this invention is to provide a low-pressure process for preparing low density ethylene copolymers.

A further object of this invention is to provide a low pressure process for preparing ethylene copolymers of high molecular weight and low density.

An additional object of this invention is to provide a process for preparing ethylene copolymers having a narrow molecular weight distribution.

Yet another object of this invention is to provide a process for reproducibly obtaining consistently comparable ethylene copolymer products from monomer mixtures of varying compositions.

Still another object of this invention is to provide a process for preparing a wide range of ethylene copolymers from a given monomer mixture composition.

Upon further study of the specification and appended claims, further objects and advantages of this invention will become apparent to those skilled in the art.

SUMMARY OF THE INVENTION

Briefly, the above and other objects are attained in one aspect of this invention by providing a process for the production of low density thermoplastic polyethylene by a low pressure copolymerization of ethylene with an α-olefin comonomer selected from the group consisting of propylene, butene-1 and mixtures thereof, which comprises the combination of employing a mixed polymerization catalyst consisting essentially of (a) titanium trichloride or a halogenated orthotitanic acid dialkyl ester and (b) ethylaluminum sesquichloride in a molar ratio of Al:Ti of 0.5–5.0, and conducting the polymerization as a liquid phase solution polymerization employing a polymerization solvent consisting essentially of $C_4$ or a mixture of $C_3$ and $C_4$ hydrocarbons containing at least 2 molar percent of butene-2.

DETAILED DISCUSSION

It is an object of the present invention to provide a polymerization method making it possible to simultaneously exploit the advantages of the Ziegler polymerization method, low polymer density, extremely high molecular weight and copolymers and/or terpolymers.

This object is attained, according to the invention, by the use of a solvent containing, on the one hand, propylene and/or butene-1 together with butane and/or propane and, on the other hand, butene-2. In contrast thereto, copolymers and terpolymers of ethylene having both low density and an extremely high molecular weight have not been heretofore obtainable.

This process makes it surprisingly possible to produce ethene co- and terpolymers, respectively, having densities of 0.90–0.955, preferably 0.9120–0.9350, and molecular weights of over 30,000 and up to about 5,000,000, preferably of over 60,000 and up to about 4,000,000, calculated in accordance with the solution viscosity.

Especially suitable titanium trichloride catalysts are those prepared by the reduction of titanium tetrachloride at temperatures of 0° to −10° C. with ethylaluminum sesquichloride. The production of such catalysts is accomplished by reducing titanium tetrachloride with hydrocarbon-diluted ethylaluminum sesquichloride at 0° to −10° C. for 4–8 hours at a Ti : Al molar ratio of 0.5–2.0, preferably 1.0–1.5. Prior to use, this particulate $TiCl_3$-containing catalyst can if desired be separated from the mother liquor; it is also possible to employ the resultant $TiCl_3$-containing suspension directly.

For activation of this titanium trichloride catalyst, chlorine-containing organaluminum compounds are suitable in an Al : Ti molar ration of 0.5–5.0, preferably 1.0–3.0 and especially 1.5–2.5. This activation is conventionally conducted by adding ethylaluminum sesquichloride, preferably as a 20% solution in a hydrocarbon solvent, to the separated $TiCl_3$ catalyst. When using a $TiCl_3$ suspension which has not been separated and which contains residual ethylaluminum dichloride from the reducing step, sufficient diethylaluminum monochloride is added to this suspension to form ethylaluminum sesquichloride. When using $TiCl_3$ catalysts activated with trialkylaluminum compounds, aluminum dialkyl hydrides, and aluminum dialkyl chlorides for copolymerization of ethylene and another α-olefin, mixtures of individual homopolymers are produced in addition to the co- and ter-polymers. For this reason, ethylaluminum sesquichloride is preferred for the activation of isolated $TiCl_3$ as described hereinabove in an Al : Ti molar ratio of 0.5–5, preferably 1.0–3.0, especially 1.5–2.5; with the use of a thus-activated titanium trichloride, a mixed catalyst is obtained which allows the formation of co- and/or terpolymers substantially free of homopolymers, i.e, containing less than 5%, preferably less than 1% by weight of homopolymers.

The catalysts are employed in catalytic amounts, preferably in a concentration of 0.1–10 millimoles per liter and at Al : Ti molar ratios of 1.0–3.0, preferably 1.5–2.5. The polymerization is conducted at temperatures of 0° to 100° C., preferably at temperatures of 50° to 90° C., and especially at 60° to 80° C., and under superatmospheric pressures of up to 50 atmospheres gauge, especially 10–40 atm. gauge.

In accordance with one aspect of this invention corresponding to German patent application No. 22 06 429.5, it is possible to obtain ethene - butene-1 copolymers of a low density with molecular weights of from over 50,000 up to about 500,000 by the polymerization of ethylene in $C_4$- and/or $C_4/C_3$-hydrocarbon cuts containing butene-1 and/or propylene, with catalysts of halogen-orthotitanic acid esters and organoaluminum chloride compounds.

Suitable catalysts are mixed catalysts of halogenorthotitanic acid esters and organoaluminum chlorides, preferably the dipropyl and/or dibutyl ester of dichlorotitanic acid and ethylaluminum sesquichloride. If desired, the halogen-orthotitanic acid ester can be produced in situ from titanium tetrahalide and orthotitanic acid ester. Catalysts of $TiCl_4$ and trialkylaluminum compounds, as well as $TiCl_3$ and trialkylaluminum compounds or dialkylaluminum halides, are unsuitable since they result in the formation of homopolymer mixtures. The catalysts are used in catalytic amounts, generally in a concentration of 0.1–20 millimoles per liter; the particular catalyst concentration required is dependent on the polymerization pressure and the impurities interfering with the polymerization. The mixed catalysts of halogen-orthotitanic acid esters and organoaluminum chlorides are generally utilized in a molar ratio Al : Ti of 1.0–2.2, preferably 1.3–1.7. Low molar ratios, e.g., Al : Ti = 1.3–1.4, lead to a narrow molecular weight distribution with a molecular nonuniformity (Mw/Mn − 1) of 2.5–4.0. Higher molar ratios result in products having a broader molecular weight distribution, e.g, a molar ratio of 1.9 yields a polymer having a nonuniformity of about 16. The polymerization is conducted at temperatures of 0° to 100° C., preferably at temperatures of 70°–90° C., especially at 80° C., and preferably at pressures of 20–50 atmospheres gauge, especially 30–40 atmospheres gauge.

Suitable as the butane are n- and isobutane, as well as any mixtures from these substances. The butene-2 can be present in the cis-form or in the trans-form, as well as in any desired mixtures thereof. In place of butene-1, it is likewise possible to employ a mixture of butene-1 and small amounts of isobutane. In such a butene-1-isobutene mixture, the proportion of isobutene should not be above 15%, based on the butene-1- isobutene mixture. The mixture ratios of propane/butane : butene-2 can be widely varied, preferred mixture ratios being 1:1 – 9:1 in parts by weight.

The butene-1 is to be present in the hydrocarbon solvent mixture in an amount of up to 25 molar percent, preferably 0.1–20 molar percent and especially 1–10 molar percent. Propene when present is to be contained in the hydrocarbon solvent mixture in amounts of up to 20 molar percent, preferably 0.1–14 molar percent and especially 1–7 molar percent.

An advantageous $C_4$-hydrocarbon solvent mixture consists, for example, of 30–60% butane, 25–50% trans-butene-2, 10–20% cis-butene-2, 0.1–30% butene-1 and 0.01–2% isobutene in part by weight per 100 parts of solvent. Furthermore, it is possible to employ the distillation residues during the butene-1 concentration process. Such a sump product of the butene-1 concentration step has the following composition, for example:

| | |
|---|---|
| butane | 43.9% |
| trans-butene-2 | 36.5% |
| cis-butene-2 | 16.3% |
| butene-1 + isobutene | 3.2% (2.8% butene-1, 0.4% isobutene) |

Furthermore, $C_3$–$C_4$- fractions can likewise be employed. The minor contamination with organic compounds containing hydroxyl groups, partially present in these mixtures, such as for example, tert.-butanol in the sump product of the butene-1 concentration step (about 100–200 p.p.m.) can be rendered ineffective by methods known in the art, e.g., by increased halogen content in the halogen-orthotitanic acid ester. Other impurities in such sump products which have not as yet been identified analytically do not impair the polymerization, but exert a lowering effect on the molecular weight, so that it is unnecessary to add hydrogen or some other additive in order to lower the molecular weight.

An advantageous $C_3$–$C_4$ fraction has for example the following composition:

| | |
|---|---|
| 20 % | propane |
| 30 % | propene |
| 10 % | butene-1 |
| 32 % | butene-2 |
| 8 % | butane |

It is surprising that, according to this invention, a very minor butene-1 and/or propene proportion is now required for the production of the ethylene co- and terpolymers; the butene-1 and propene present in the $C_3$–$C_4$ hydrocarbon mixtures is copolymerized to 10–90%. An additional advantage is that it is possible to use, in place of the expensive, high-percentage butene-1, the considerably less costly $C_4$- or $C_3/C_4$-hydrocarbon mixtures. These low-boiling hydrocarbon mixtures have the additional advantage over the higher-boiling hydrocarbons in that they effect a better removal of the heat of polymerization by evaporative cooling at higher pressures, and that the thus-obtained polymer can be dried considerably more simply, gently and more rapidly.

The novel process makes it possible to produce polyethylene co- and terpolymers with a density of about 0.90–0.955, preferably 0.9120–0.9360. These products have a very good notch impact strength and excellent stress-crack resistance, even at low temperatures down to −50° C. Due to this superior stress-crack resistance, these types of polyethylene are suitable for heavy duty applications such as pipe and wire coating, bagging, and in particular for the packaging of detergents. It is likewise possible according to this process to produce products having a density of below 0.90. However, because of their lower rigidity, these polymers are better suited for use as a coating and sealing substance.

It has furthermore surprisingly been found that the proportion of propylene and/or butene-1 which can be present in the total solvent mixture of this invention is inversely dependent on the polymerization temperature.

At a polymerization temperature of up to 100° C., this proportion is not to exceed 15 molar percent, wherein the propylene proportion is not to rise above 5% and the butene-1 proportion is not to exceed 15%. Preferably this proportion is at least 5 molar percent, wherein the propylene proportion is at least 1 percent and the butene-1 proportion is at least 5 percent.

In contrast thereto, if the polymerization is conducted at lower temperatures, e.g., of 80°, 70°, 60° and 40° C., the proportion of propylene can be increased up to 10, 25, 50 and 95 molar percent, respectively, and the butene-1 proportion can similarly be 25, 60, 95 and 95 molar percent, respectively. For example, the maximum amount of combined propylene and/or butene-1 present in the solvent mixture is not greater than 15 molar percent and the maximum amount of propylene is not greater than 5 molar percent at a polymerization temperature of up to 100° C. Similarly, the maximum amount of combined propylene and/or butene-1 present in the solvent mixture is not greater than 95 molar percent and the maximum amount of propylene is not greater than 95 molar percent at a polymerization temperature of up to 40° C.

This realization is surprising, as well as valuable, and provides a large number of possibilities for variation; for example, it is now possible, starting from gaseous monomer mixtures of varying composition to obtain consistently comparable polymers. It is likewise possible, starting from a single gaseous monomer mixture, to modify the polymer properties within broader limits than heretofore possible.

Furthermore, as compared to older processes for the preparation of ethene - butene-1-copolymers, such as German Pat. No. 1,445,303, it is surprising that in certain cases only a very minor proportion, e.g., as little as or even 0.1% of butene-1 and/or propene is required for the production of the ethylene co- and/or terpolymers.

The novel process makes it possible to produce polyethylene co- and terpolymers with a density of about 0.90–0.955, preferably 0.9120–0.9360, and molecular weights of about 30,000 to about 5,000,000, preferably of about 60,000 to about 4,000,000 calculated in accordance with the solution viscosity. Thus, types of polyethylene are obtained which could not heretofore be produced by the known prior art processes, whether low- or medium-pressure processes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the following examples, the physical properties set forth were determined according to standard testing techniques. Relative Solution Viscosity (RSV) was determined in an Ostwald-type viscosimeter. Viscosity average molecular weight was measured according to lg $$\overline{M}v = \frac{lg|RSV| - lg\ 3.26 \cdot 10^{-4}}{0.77}.$$

Weight average ($M_w$) and number average ($M_n$) molecular weights were obtained by chromatographic and dispersion methods respectively. Melt flow values (MF) are calculated from DIN 53 735. Yield stress and yield stress elongation were determined according to DIN 53 455, ruptural strength and ruptural strength elongation were measured by DIN 53 455, while tensile impact strength was determined according to DIN 53 448 IR analysis was conducted with an NaCl prism spectrometer (Perkin Elmer M21).

EXAMPLE 1

Into a 50-liter, 50 atmospheres gauge kettle, there are charged 12 parts by weight of a butene-butane mixture containing 43.9% butane, 36.5% trans-butene-2, 16.3% cis-butene-2, 2.8% butene-1, 0.4% isobutene and 130 p.p.m. of tert.-butanol. The butene-butane mixture is the sump product of a butene-1 concentration process using a distillation column with 170 theoretical plates from a C$_4$-distillation cut consisting of:

```
 2 %   i-butene
21 %   n-butane
46.5 % butene-1
 0.5 % i-butene
18 %   trans-butene-2
12 %   cis-butene-2
65     ppm tert. butanol.
```

This charge is mixed at 15° under agitation with 0.0186 part by weight ethylaluminum sesquichloride (as a 20% solution in hexane), 0.01042 part by weight titanium tetrachloride, and 0.01277 part by weight tetrapropyl titanate. After 15 minutes, the mixture is heated to 80° C. and, at this temperature, 4 parts by weight of ethylene is introduced up to a pressure of 41 atm. gauge. The average polymerization pressure is 30 atm. gauge. After a polymerization time of 2 hours, the pressure has dropped to 23 atm. gauge. After the addition of 15.8 parts by weight of methanol and cooling to 20° C. to terminate the polymerization reaction, unreacted ethylene is expanded with the butene-butane mixture. After separating the methanol and drying the polyethylene type polmer, 2.4 parts by weight of polyethylene type polymer is obtained having the characteristic properties shown in Table 1. The molecular weight distribution is:

```
< M̄w/5               25.6%
  M̄w/5 – Mw          47.6%
> M̄w                 26.8
```

Thus, 25.6% of the polymer has a molecular weight smaller than 1/5 of the weight average, 47.6% is between the weight average and 1/5 of the weight average, and 26.8% is of a molecular weight larger than the weight average.

EXAMPLE 2

By conducting the polymerization according to the above procedure in the presence of 2 atm. gauge hydrogen, an ethene-butene copolymer is analogously obtained having a RSV value of 0.7 dl/g.

EXAMPLE 3

Into a 50-liter, 50 atm. gauge agitator-equipped vessel, there is introduced 12 parts by weight of a butene-butane mixture containing 43.5% butane, 36.2% trans-butene-2, 16.2% cis-butene-2, 3.8% butene-1, 0.3% isobutene and 130 p.p.m. tert.-butanol; at 11° C. and under agitation, the catalyst of Example 1 is added to this mixture. After 15 minutes, the charge is heated to 80° C. and, at this temperature, 3.0 parts by weight of ethylene is added to a pressure of 40 atm. gauge. After the pressure has dropped to 35 atm. gauge, an additional 1.0 part by weight of ethylene is added. The pressure rises briefly to 46 atm. gauge, and the temperature rises briefly to 90° C. The polymerization is terminated at 80° C. after a polymerization time of 1 ¾ hours by adding 15.8 parts by weight methanol. The mixture is cooled to 20° C., and the unreacted ethylene is adiabatically expanded (blown off) with the butene-butane mixture. After separating the methanol and drying the polyethylene-type polymer, 2.1 parts by weight of an ethylene-butene-1 copolymer is obtained, having the characteristic properties shown in Table 1.

Except for the molecular weight, the physical properties of this product correspond extensively to those of a high-pressure polyethylene. This product, in accordance with the density, exhibits properties which heretofore could only be attained by using the process of high-pressure polymerization; the molecular weight, however, is higher than hitherto producible according to the high pressure process.

EXAMPLE 4

Into a 50-liter, 50 atm. gauge, agitator-equipped vessel are charged 12 parts by weight of a mixture of 60% butane and 40% butene-2 containing 0.1% butene-1. Under agitation, at 20° C., 0.0186 part by weight ethylaluminum sesquichloride (as a 20% solution in hexane), 0.0095 part by weight titanium tetrachloride, and 0.0142 part by weight tetrapropyl titanate are added to the mixture. After 15 minutes, 1 atm. gauge of hydrogen is added and the mixture heated to 80° C. At this temperature, 4 parts by weight of ethylene is added up to a pressure of 45 atm. gauge. After 2 hours, 15.8 parts by weight of methanol is introduced and, after cooling to room temperature, the unreacted ethylene is expanded with the butane/butene. After the methanol has been separated and the polyethylene-type polymer has been dried, one obtains 3.4 parts by weight of a polyethylene-type polymer having the properties shown in Table 1.

EXAMPLE 5

By effecting the polymerization according to the description of Example 4 in the presence of 3 atm. gauge hydrogen, a polyethylene-type polymer is obtained having a RSV-value of 1.6 and a density of 0.955.

EXAMPLE 6

At 20° C., 1.2 parts by weight of $C_4$-hydrocarbon mixture of 40% butane, 50% butene-2 and 10% butene-1 is charged into a 5-liter laboratory autoclave.

A catalyst comprising 0.00568 part by weight tetrapropyl titanate, 0.0038 part by weight titanium tetrachloride, and 0.00744 part by weight ethylaluminum sesquichloride is added to this mixture. After 15 minutes, the temperature is raised to 80° C. and ethylene is introduced up to a pressure of 14 atm. gauge. The polymerization is conducted over a period of 4 hours at 80° C. and a pressure of 13-14 atm. gauge. After the addition of 0.010 part by weight of methanol expansion, and cooling, 0.35 part by weight of a polyethylene-type polymer is obtained having the characteristic properties shown in Table 1.

EXAMPLE 7

Into a 50-liter, 50 atm. gauge vessel are charged 12 parts by weight of a $C_4$-hydrocarbon mixture containing 20.5% n-butane, 50.6% trans-butene-2, 28.0% cis-butene-2, 0.64% butene-1, 0.06% isobutene, and 0.1% 1,3-butadiene. At 15° C., 0.0186 part by weight ethylaluminum sesquichloride (as a 20% solution in hexane), 0.00947 part by weight titanium tetrachloride, and 0.01418 part by weight tetrapropyl titanate are added under agitation. The polymerization is conducted in accordance with the process described in Example 1. The product is 2.9 parts by weight of a polyethylene-type polymer having the properties shown in Table 1.

EXAMPLE 8

In accordance with the method of Example 7, ethylene is polymerized in a solvent comprising 12 parts by weight of a $C_4$-hydrocarbon mixture of 40% butane, 58% butene-2, and 2% of butene-1 in the presence of 2 atm. gauge of hydrogen. A polyethylene-type polymer (3.2 parts by weight) is obtained having the properties set forth in Table 1.

For comparison purposes, the Bell test, 50° C., was conducted with a high-pressure polyethylene, RSV 1.12 dl/g., $\bar{M}v$ 35,000, density 0.9168 $g/cm^2$: 17 hours.

EXAMPLE 9

According to the procedure of Example 6, ethylene is polymerized in a solvent comprising 1.2 parts by weight of a $C_4$-hydrocarbon mixture of 40% butane, 40% butene-2, and 20% butene-1. The product is 0.37 part by weight of a polyethylene-type ethene-butene-1-copolymer having the properties given in Table 1.

EXAMPLE 10

In accordance with the procedure of Example 6, ethylene is polymerized in 1.2 parts by weight of a $C_4$-hydrocarbon mixture of 60% butane, 10% butene-2 and 30% butene-1. The product is 0.31 part by weight of a soft ethene - butene-1 polymer having a density of 0.8865. In accordance with the IR analysis, the polymer contains about 30% polybutene-1

EXAMPLE 11

In accordance with the procedure of Example 6, ethylene is polymerized in 1.2 parts by weight of a $C_3/C_4$-hydrocarbon mixture of 20% propane, 2.5% propene, 50% butane, and 27.5% butene-2, yielding 0.384 part by weight of a polyethylene-type polymer having the characteristic properties set forth in Table 2.

EXAMPLE 12

A mixture of 0.8 part by weight butane, 0.28 part by weight butene-2, and 0.12 part by weight butene-1 (10 molar percent) is charged into a 5-liter laboratory autoclave. A catalyst is added thereto consisting of 0.00128 part by weight titanium trichloride (obtained by the reduction of 1 mole of 100% strength titanium tetrachloride at −5° C. with 1.4 moles of ethylaluminum sesquichloride, molecular weight 123.7; 20% strength in hexane for 6 hours, a subsequent post reaction for 15 hours at 0° to 10° C., and separation of the precipitate), and of 0.00206 part by weight ethylaluminum sesquichloride. The temperature is increased to 80° C., and ethylene is introduced up to a pressure of 15 atm. gauge. The polymerization is conducted for 4 hours at 80° C. The pressure is maintained at 12-15 atm. gauge by replenishing with ethylene. After expansion, cooling, and catalyst deactivation with 0.01 part by weight of methanol, 0.336 part by weight of a ethylene - butene-1 copolymer is obtained having the characteristic data set forth in Table 2.

EXAMPLE 13

Into a 50-liter, 50 atm. gauge vessel is charged 12 parts by weight of a mixture of 70% butane, 25% butene-2 and 5% butene-1. A catalyst of 0.0064 part by weight of titanium trichloride, produced as described in Example 1, and 0.0103 part by weight ethylaluminum sesquichloride is added thereto. The temperature is raised to 60° C. The polymerization is conducted for 2 hours at 60° C. and under a pressure of 30 atm. gauge.

After the addition of 0.1 part by weight of methanol, the mixture is cooled to 20° C. and the unreacted ethylene expanded together with the butene-butane mixture, yielding 3.2 parts by weight of a polyethylene-type polymer having the properties shown in Table 2.

EXAMPLE 14

A 5-liter laboratory autoclave is charged with 1.8 parts by weight of a mixture of 60% butane, 20% butene-2 and 20% butene-1. A catalyst is added to this mixture consisting of 0.0018 part by weight titanium trichloride catalyst prepared as described in Example 12 and 0.0029 part by weight ethylaluminum sesquichloride. At 80° C., ethylene is added up to a pressure of 15 atm. gauge. Thereafter, hydrogen is fed up to a partial pressure of 1 atm. gauge. After a polymerization time of 3 hours, 0.418 part by weight of an ethene - butene-1 copolymer is obtained having a butene content of 11 weight % and the properties shown in Table 2; with centrally positioned trans bonds.

EXAMPLE 15

When adding hydrogen up to a partial pressure of 3 atm. gauge, a copolymer is obtained having a RSV value of 2.3 dl/g. and a butene content of 11 weight % under the above conditions.

EXAMPLE 16

Following the procedure of Example 14, ethylene is polymerized in 1.8 parts by weight of a mixture of 60% butane, 25% butene-2 and 15% butene-1, thus obtaining 0.376 part by weight of an ethene - butene-1 copolymer having a butene-1 content of 9 weight % and properties given in Table 2.

EXAMPLE 17

Following the procedure of Example 14, ethylene is polymerized in 1.8 parts by weight of a mixture of 50% butane, 40% butene-2 and 10% butene-1 in the presence of 1 atm. gauge hydrogen partial pressure. The product is 0.392 part by weight of an ethene - butene-1 copolymer having a butene-1 content of about 10 weight % and with the characteristics shown in Table 2.

EXAMPLE 18

Following the procedure of Example 14, ethylene is polymerized in 1.8 parts by weight of a mixture of 40% butane, 30% butene-2, 25% propane and 5% propene, thus obtaining 0.374 part by weight of an ethene - propene copolymer having a propene content of 4 weight % and characteristic values shown in Table 3.

EXAMPLE 19

When adding 3 atm. gauge of hydrogen, a coplymer is obtained having a RSV-value of 1.2 dl/g. and a propene content of 4 weight% under the above conditions.

EXAMPLE 20

Analogously to the process of Example 14, ethylene is polymerized in 1.8 parts by weight of a mixture of 45% butane, 25% butene-2, 5% butene-1, 20% propane and 5% propene, thus producing 0.368 part by weight of an ethene - propene - butene-1 terpolymer having the characteristics set forth in Table 3 and a homopolymer content of ca. 1%.

EXAMPLE 21

According to the process of Example 14, ethylene is polymerized in 1.8 parts by weight of a mixture of 96% butene-1, 3% butane and 2% butene-2 at 60° C. The product thus obtained is 0.412 part by weight of an ethene - butene-1 copolymer having a butene-1 content of 18 weight% and the characteristics shown in Table 3.

EXAMPLE 22

As described in Example 14, ethylene is polymerized in 1.8 parts by weight of a mixture of 76% propene, 19% butene-1, 3% butane and 2% butene-2 at 25° C., thus obtaining 0.143 part by weight of an ethene - propene - butene-1 terpolymer having the properties given in Table 3 and a homopolymer content of <1%. 27.8% of the polymer was ether-soluble.

EXAMPLE 23

In accordance with the process of Example 14, ethylene is polymerized in 1.8 parts by weight of a mixture of 20% butene-1, 60% butane and 20% butene-2 at 70° C., this producing 0.325 part by weight of an ethene - butene-1 copolymer having the properties shown in Table 3.

The preceding examples can be repeated with similar success by substituting the generically or specifically described reactants and/or operating conditions of this invention for those used in the preceding examples From the foregoing description, one skilled in the art can easily ascertain the essential characteristics of this invention, and without departing from the spirit and scope thereof, can make various changes and modifications of this invention to adapt it to various usages and conditions.

TABLE 1

| PROPERTIES | EXAMPLES | | | | | | |
| --- | --- | --- | --- | --- | --- | --- | --- |
| | 1 | 3 | 4 | 6 | 7 | 8 | 9 |
| RSV, dl/g. | 2.5 | 1.63 | 6.5 | 7.95 | 2.72 | 2.09 | 3.1 |
| $\bar{M}v$ | 101,000 | 60,000 | 357,000 | 380,000 | 112,000 | 82,000 | 130,000 |
| Molecular Nonuniformity U=(Mw/Mn) − 1 = | 3.9 | 2.6 | | | 3.8 | 3.1 | 4.0 |
| Butene. mol% | | | | | | | |
| Propene. mol% | NA | NA | NA | NA | NA | NA | NA |
| Double Bonds/1000 C. | | | | | | | |
| Trans | 0.02 | 0.16 | 0.02 | 0.12 | 0.04 | 0.03 | 0.22 |
| Vinyl | 0.26 | 0.34 | 0.17 | 0.15 | 0.23 | 0.26 | 0.19 |
| Vinylidine | 0.02 | 0.06 | 0.02 | 0.04 | 0.02 | 0.02 | 0.04 |
| CH₃/100 C. | 1.3 | 3.3 | 0.1 | 1.5 | 0.95 | 0.92 | 2.6 |
| Density. gm/cm³ | 0.934 | 0.9201 | 0.9475 | 0.9279 | 0.9369 | 0.9289 | 0.9205 |
| MF 190/2.16.g/10 min. | 0.52 | 3.0 | —* | —* | 0.38 | 1.1 | 0.87 |
| MF 190/5.g/10 min. | 1.6 | 9.2 | 0.04 | —* | 1.2 | 3.0 | 3.8 |
| Yield Stress, kp/cm² | 175 | 100 | 249 | 157 | 207 | 154 | 81 |
| Yield Stress Elongation. % | 17 | 17 | 20 | 23 | 23 | 17 | 22 |
| Ruptural Strength, kp/cm² | 280 | 154 | 307 | 323 | 368 | 313 | 178 |
| Ruptural Strength Elongation. % | 650 | 610 | 457 | 603 | 823 | 813 | 413 |
| Tensile Impact Strength,kp cm/cm² | 972 | | 1.500 | 1.500 | 965 | 683 | |
| Softening Point. °C. | 119 | 88 | 120 | 109 | 120 | 109 | 89 |
| Bell Test 50°C.. hrs. | | | | 200 | | 200 | |

*Immeasurable, product does not flow.

TABLE 2

| PROPERTIES | EXAMPLES | | | | | |
|---|---|---|---|---|---|---|
| | 11 | 12 | 13 | 14 | 16 | 17 |
| RSV, dl/g. | 2.93 | 30 | 42 | 6.44 | 12.86 | 5.4 |
| $\bar{M}v$ | 123,000 | 2,500,000 | 4,000,000 | 353,000 | 812,000 | 284,000 |
| Molecular Nonuniformity U=(Mw/Mn) −1= | 4.0 | | | | | |
| Butene, mol% | | | | | | |
| Propene, mol% | NA | NA | NA | | NA | NA |
| Double Bonds/1000 C. | | | | | | |
| Trans | 0.02 | <0.02 | <0.02 | 0.36 | 0.38 | 0.36 |
| Vinyl | 0.37 | 0.06 | 0.05 | 0.69 | 0.15 | 0.21 |
| Vinylidene | 0.02 | <0.02 | <0.02 | 0.03 | 0.16 | 0.81 |
| $CH_3$/100 C. | 1.7 | 1.8 | 0.95 | 5.5 | 4.5 | 5.0 |
| Density, gm/cm$^3$ | 0.9286 | 0.9220 | 0.9226 | 0.9180 | 0.910 | 0.9195 |
| MF 190/2.16, g/10 min. | 0.28 | <0.1 | <0.1 | 0.12 | <0.1 | |
| MF 190/5, g/10 min. | 0.86 | <0.1 | <0.1 | 0.92 | <0.1 | |
| Yield Stress, kp/cm$^2$ | 145 | 149 | 154 | 78 | 86 | 93 |
| Yield Stress Elongation, % | 17 | 23 | 23 | 33 | 33 | 33 |
| Ruptural Strength, kp/cm$^2$ | 230 | 333 | 348 | 101 | 169 | 151 |
| Ruptural Strength Elongation, % | 517 | 410 | 452 | 657 | 573 | 587 |
| Tensile Impact Strength, kp cm/cm$^2$ | | >1.500 | >1.500 | | | |
| Softening Point, °C. | 109 | 115 | 115 | | | |
| Bell Test 50°C., hrs. | | 200 | 200 | | | |

TABLE 3

| PROPERTIES | EXAMPLES | | | | | |
|---|---|---|---|---|---|---|
| | 18 | 20 | 21 | 22 | 23 | 24 |
| RSV, dl/g | 7.8 | 5.2 | 15.0 | 20.0 | 17.3 | 5.2 |
| $\bar{M}v$ | 447.00 | 240.000 | 1.040.000 | 1.530.000 | 1.250.000 | 240.000 |
| Molecular Nonuniformity U =(Mw/Mn)−1= | | | | | | |
| Butene, mol% | | | | | | |
| Propene, mol% | NA | | NA | NA | | |
| Double Bonds/1000 C | | | | | | |
| Trans | | | | | 0.20 | |
| Vinyl | | | | | 0,11 | |
| Vinylidine | | | | | 0,14 | |
| $CH_3$100 C | | | | | 11 | |
| Density, gm/cm$^3$ | 0,9310 | 09260 | 0,9160 | 0,905 | 0,9235 | 0,9260 |
| MF 190/2.16, g/10 min. | | | | | | |
| MF 190/5, g/10 min. | | | | | | |
| Yield Stress, kp/cm$^2$ | 162 | 146 | 72 | 48 | 107 | 146 |
| Yield Stress Elongation, % | 21 | 22 | 33 | 33 | 50 | 22 |
| Ruptural Strength, kp/cm$^2$ | 316 | 314 | 174 | 92 | 238 | 314 |
| Ruptural Strength Elongation, % | 426 | 443 | 584 | 350 | 493 | 443 |
| Tensile Impact Strength, kp cm/cm$^2$ | 1500 | | | 1500 | | |
| Softening Point, °C | 120 | | | 112 | | |
| Bell Test 50 °C., hrs. | 200 | | | 200 | | |

What is claimed is:

1. In a process for the production of low density thermoplastic ethylene copolymers by a low pressure copolymerization of ethylene with an α-olefin comonomer selected from the group consisting of propylene, butene-1 and mixtures thereof, which comprises the combination of employing a particulate mixed polymerization catalyst consisting essentially of (a) titanium trichloride or a halogenated orthotitanic acid dialkyl ester and (b) ethylaluminum sesquichloride in a molar ratio Al:Ti of 0.5–5.0, the improvemenet which comprises conducting the polymerization as a liquid phase solution polymerization employing a polymerization solvent consisting essentially of $C_4$ or a mixture of $C_3$ and $C_4$ hydrocarbons containing at least 10 molar percent of butene-2.

2. A process according to claim 1 wherein said solvent consists essentially of, per 100 parts of weight of solvent, 30–60 parts propane and/or butane; 25–50 parts transbutene-2, 10–20 parts cis-butene-2; 0.1–30 parts combined propylene and butene-1; and 0.01–2 parts isobutene.

3. A process according to claim 1 wherein said solvent is a C 4 hydrocarbon mixture consisting essentially of, per 100 parts by weight of solvent, 30–60 parts butane; 25–50 parts trans-butene-2; 10–20 parts cis-butene-2; 0.1–30 parts butene-1; and 0.01–2 parts isobutene.

4. A process according to claim 3 wherein said solvent is the distillation residue obtained from the sump of a butene-1 concentration process.

5. A process according to claim 1 wherein said solvent consists essentially of about 44 parts butane; about 37 parts trans-butene-2; about 16 parts cis-butene-2; and about 3 parts combined butene-1 and isobutene, of which combination less than 15% is isobutene.

6. A process according to claim 1 wherein said solvent contains 0.1–20 molar percent butene-1.

7. A process according to claim 1 wherein said solvent contains 0.1–14 molar percent propylene.

8. A process according to claim 1 wherein the maximum amount of combined propylene and/or butene-1 present in the solvent mixture is not greater than 15 molar percent and the maximum amount of propylene is not greater than 5 molar percent at a polymerization temperature of up to 100° C.

9. A process according to claim 1 wherein the maxiumum amount of combined propylene and/or butene-1 present in the solvent mixture is not greater than 25 molar percent and the maximum amount of propylene is not greater than 10 molar percent at a polymerization temperature of up to 80° C.

10. A process according to claim 1 wherein the maximum amount of combined propylene and/or butene-1 present in the solvent mixture is not greater than 60 molar percent and the maximum amount of propylene is not greater than 25 molar percent at a polymerization temperature of up to 70° C.

11. A process according to claim 1 wherein the maximum amount of combined propylene and/or butene-1 present in the solvent mixture is not greater than 95 molar percent and the maximum amount of propylene is not greater than 50 molar percent at a polymerization temperature of up to 60° C.

12. A process according to claim 1 wherein the maximum amount of combined propylene and/or butene-1 present in the solvent mixture is not greater than 95 molar percent and the maximum amount of propylene is not greater than 95 molar percent at a polymerization temperature of up to 40° C.

13. A process according to claim 1 further comprising adiabatically expanding unreacted monomers with said solvent at the completion of the polymerization reaction.

14. A process according to claim 1 wherein said catalyst component (a) is the dipropyl or dibutyl ester of dichlorotitanic acid and the molar ratio of Al:Ti is 1.0–2.2.

15. A process according to claim 14 wherein said molar ratio is 1.3–1.4.

16. A process according to claim 1 wherein said catalyst component (a) is titanium trichloride and the molar ratio of Al:Ti is 1.0–3.0

* * * * *